United States Patent [19]

Hostler et al.

[11] Patent Number: 5,591,361

[45] Date of Patent: *Jan. 7, 1997

[54] SEALING ARRANGEMENT FOR A LASER ENCLOSURE

[75] Inventors: Jonathan E. Hostler, Canton, Mich.; William H. DeCamp, Cincinnati; Daniel W. Slanker, Huber Heights, both of Ohio

[73] Assignee: Motoman, Inc., West Carrollton, Ohio

[*] Notice: The term of this patent shall not extend beyond the expiration date of Pat. No. 5,464,963.

[21] Appl. No.: 552,566

[22] Filed: Nov. 3, 1995

Related U.S. Application Data

[63] Continuation of Ser. No. 113,227, Aug. 27, 1993, Pat. No. 5,464,963.

[51] Int. Cl.⁶ ................................................. B23K 26/02
[52] U.S. Cl. ............................ 219/121.82; 219/121.6; 219/736
[58] Field of Search ........................... 219/121.6, 121.76, 219/121.63, 121.82, 121.84, 736, 738

[56] References Cited

U.S. PATENT DOCUMENTS 3,775,586  11/1973  Flint et al. .
4,205,216   5/1980  Douglas .
4,617,446  10/1986  Anderson .
4,884,189  11/1989  Kimura et al. .
5,183,993   2/1993  Sato et al. .
5,464,963  11/1995  Hostler et al. .................... 219/121.82

OTHER PUBLICATIONS

Vasilah, G., "An Exclusive Look: Motoman's Laser World: . . . ," Reprinted from *Production* Magazine, Jul. 1992.

*Primary Examiner*—Tu Hoang
*Attorney, Agent, or Firm*—Killworth, Gottman, Hagan & Schaeff

[57] ABSTRACT

A protective enclosure is provided for a laser system having a laser generator for generating and directing a laser beam to a laser workstation. The enclosure includes a housing having an inner cavity for containing the laser workstation. The housing further includes a section having an opening through which workpieces pass into and out of the inner cavity. The enclosure additionally includes a rotary turntable for moving the workpieces through the opening into and out of the inner cavity, and passive sealing members movably coupled to the section for sealing a portion of the rotary turntable with a portion of the section to inhibit laser energy from exiting the housing through the opening.

20 Claims, 10 Drawing Sheets

SEALING ARRANGEMENT FOR A LASER ENCLOSURE

This is a continuation of application Ser. No. 08/113,227 filed Aug. 27, 1993, now U.S. Pat. No. 5,464,963.

BACKGROUND OF THE INVENTION

The present invention relates in general to the use of industrial lasers and, more particularly, to a passive sealing arrangement for an enclosure which houses industrial lasers or like devices.

Industrial lasers are known in the prior art. Such lasers are commonly used for purposes of welding and cutting. U.S. and international standards have been developed which divide all industrial lasers into four major hazard categories, i.e., four broad classes (I to IV). The weakest lasers are Class I lasers which emit laser radiation below known hazard levels. The strongest lasers are Class IV lasers which are hazardous to view under any condition (directly or diffusely scattered) and are a potential fire hazard and a skin hazard.

Laser enclosures are also known in the prior art. Such enclosures are commonly used as protective enclosures for higher powered lasers, e.g., Class II, Class III or Class IV lasers, and allow the higher powered lasers to operate in a lower classification. For example, some Class I industrial lasers consist of a higher class laser enclosed in a properly interlocked and labeled protective enclosure.

One laser enclosure found in the prior art encases a laser workstation. Associated with the workstation is a laser device which acts to generate and direct a laser beam to the workstation for performing laser operations upon workpieces that pass into the enclosure.

The noted laser enclosure comprises three stationary walls, a stationary ceiling and a fourth stationary wall having an opening through which workpieces pass into and out of the inner cavity of the enclosure. The enclosure includes a rotary turntable having four vertical partitions that attach to a hub at the turntable's center of rotation, which is coplanar with the fourth stationary wall. Positioned between the four vertical partitions are four fixtures for mounting workpieces onto the rotary turntable.

Portions of two of the vertical partitions are sealed to a portion of the fourth stationary wall by hinged flaps to inhibit the escape of laser radiation from the enclosure. Those flaps are moved between sealing and non-sealing positions by a plurality of pneumatic cylinders. It has been found that operation of the cylinders is time consuming, resulting in an undesirable pause occurring between laser operations. Accordingly, this active sealing arrangement is a substantial limitation on welding efficiency, especially where a succession of workpieces is to be welded.

There is therefore a need for an improved sealing arrangement which does not require active drive devices, such as pneumatic cylinders, to accomplish sealing. Furthermore, there is a need for an improved sealing arrangement which allows sealing to be accomplished in a quick and efficient manner.

SUMMARY OF THE INVENTION

These needs are met by the passive sealing arrangement of the present invention. The sealing arrangement forms part of a protective enclosure which may, for example, encase a Class IV laser to allow it to operate as a Class I laser. The protective enclosure further includes a housing having a section with an opening through which workpieces pass into and out of an inner cavity of the housing. Additionally provided is transport means for moving workpieces through the opening into and out of the inner cavity. The passive sealing arrangement serves to seal a portion of the transport means to a portion of the housing section to inhibit the escape of laser energy from the enclosure. The sealing arrangement of the present invention allows sealing to be accomplished in a quick and efficient manner.

In accordance with a first aspect of the present invention, a laser system is provided which includes generator means for generating and directing a laser beam to a laser workstation. The system further includes a housing having an inner cavity for containing the laser workstation. The housing includes a section having an opening through which workpieces pass into and out of the inner cavity. The laser system additionally includes transport means for moving the workpieces through the opening into and out of the inner cavity, and passive sealing means movably coupled to one of the section and transport means for sealing a portion of the transport means with a portion of the section to inhibit laser energy from exiting the housing through the opening.

The housing preferably further includes first, second and third generally vertical walls, and a stationary ceiling connected to the first, second and third walls and the section.

The transport means may comprise a rotary turntable and a vertical partition mounted on the rotary turntable for rotation therewith. The vertical partition extends through the center of rotation of the rotary turntable, which is generally coplanar with the section of the housing.

The passive sealing means may comprise first and second sealing members and attachment means for movably mounting the first and second sealing members to the section. The transport means rotates between first and second locked positions and engages with the first and second sealing members as it rotates to either of its first and second locked positions to move the first and second sealing members to a sealed position.

Preferably, the first and second sealing members each have inner and outer substantially planar surfaces. The portion of the transport means engages with the outer surface of the first sealing member and the inner surface of the second sealing member when the transport means is positioned in its first locked position and engages with the inner surface of the first sealing member and the outer surface of the second sealing member when the transport means is positioned in its second locked position.

The attachment means preferably comprises one or more first pendulum pivot links coupled between the section of the housing and the first sealing member and one or more second pendulum pivot links coupled between the section of the housing and the second sealing member. Each of the first and second sealing members preferably comprises a beam having a generally I-shaped cross section. The portion of the transport means has a generally T-shaped cross section. The section of the housing has a generally C-shaped cross section in order to envelop the two sealing members while permitting them to move to a sealed position.

In accordance with a second aspect of the present invention, a system is provided for operating on a workpiece and includes a welding device positioned at a welding workstation. Further provided is a housing having an inner cavity for containing the welding workstation. The housing includes a section having an opening through which workpieces pass into and out of the inner cavity. The system additionally includes transport means for moving the workpieces through the opening into and out of the inner cavity, and passive sealing means pivotably coupled to the section for sealing a portion of the transport means with a portion of the section to inhibit electromagnetic energy from exiting the housing through the opening.

In accordance with a third aspect of the present invention, an enclosure is provided and includes a housing having an inner cavity for containing a welding workstation. The housing includes a section having an opening through which workpieces pass into and out of the inner cavity. The enclosure further includes transport means for moving the workpieces through the opening into and out of the inner cavity, and passive sealing means pivotably connected to the section for sealing a portion of the transport means with a portion of the section to inhibit electromagnetic energy from exiting the housing through the opening.

Accordingly, it is an object of the present invention to provide an improved sealing arrangement for a protective enclosure. It is a further object of the present invention to provide an improved protective enclosure for encasing a workstation. It is another object of the present invention to provide an improved passive sealing arrangement for a laser enclosure. It is yet another object of the present invention to provide an improved laser-enclosure for encasing a laser workstation. These and other objects and advantages of the present invention will be apparent from the following description, the accompanying drawings and the appended claims.

DETAILED DESCRIPTION OF THE INVENTION

Figure 1:
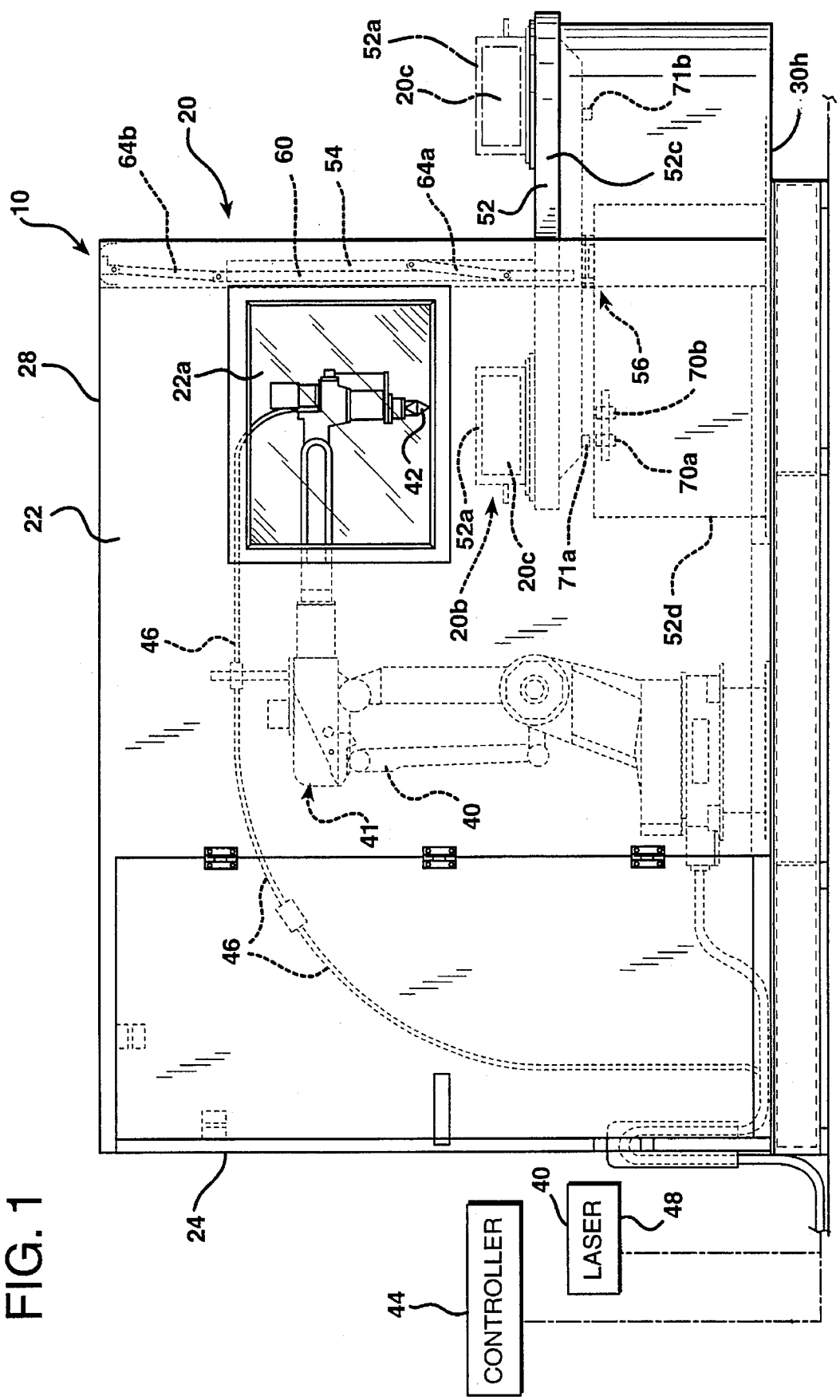
FIG. 1 is a side view of a protective enclosure constructed in accordance with the present invention.

Reference is now made to FIG. 1, which illustrates a protective laser enclosure 10 constructed in accordance with the present invention. The enclosure 10 includes a housing 20 having first, second and third generally vertical walls 22, 24 and 26, respectively, see also FIGS. 3 and 4. A stationary ceiling 28 is fixedly connected to the first, second and third walls 22, 24, and 26. A front channel section 30 is connected to the first and third walls 22 and 26 and the ceiling 28. The first and third walls 22 and 26, in the illustrated embodiment, include filtered viewing ports 22a and 26a.

Figure 4:
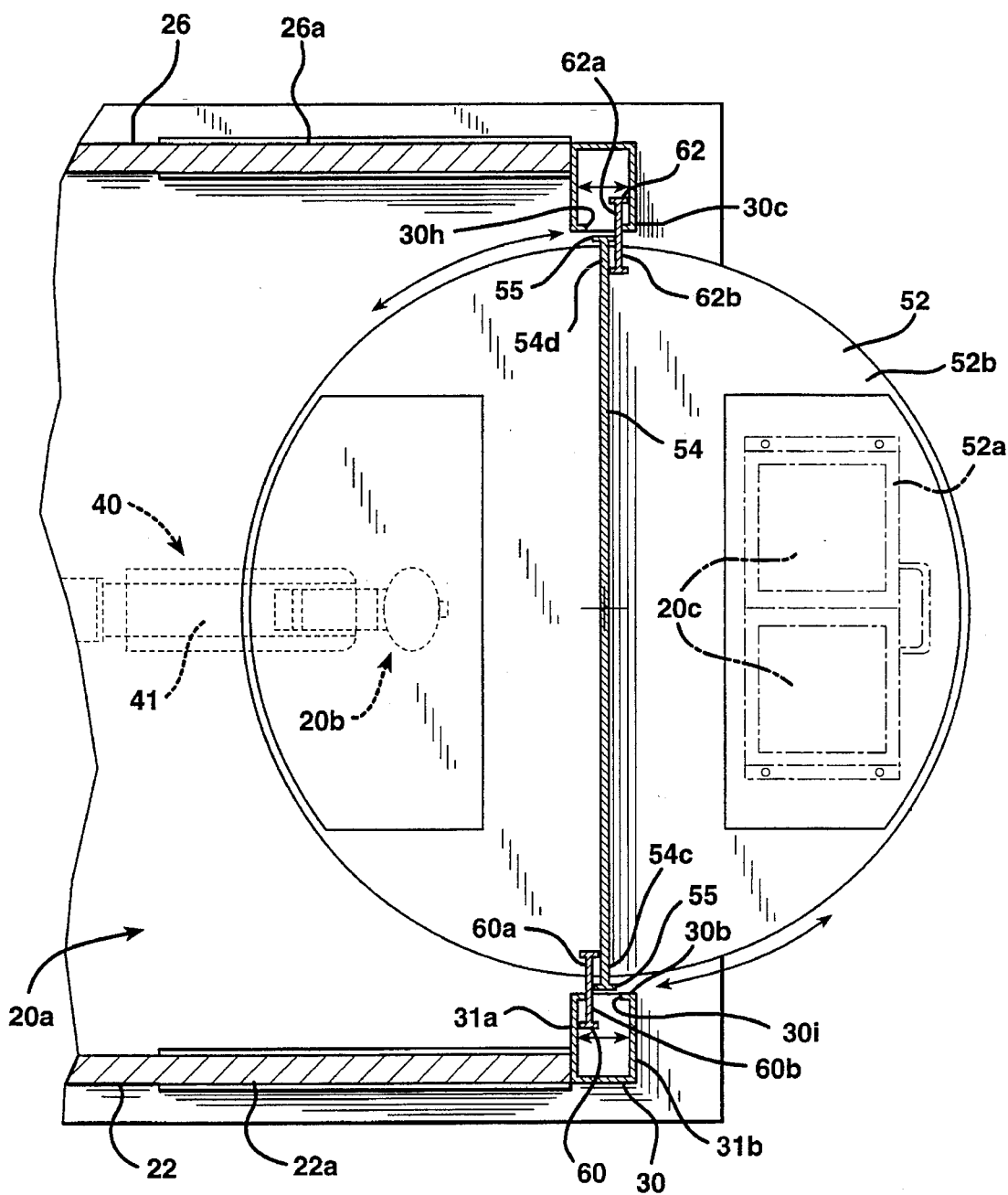
FIG. 4 is a view taken along section line 4—4 in FIG. 3, but with the pendulum pivot links removed.

The housing 20 includes an inner cavity 20a containing a laser workstation 20b, see FIG. 4. Associated with the laser workstation 20b is a welding device 40 for cutting or welding a workpiece 20c. The device 40 comprises, in the illustrated embodiment, an articulated arm robot 41 (see, e.g., U.S. Pat. No. 4,884,189, the disclosure of which is hereby incorporated by reference) having a Nd:YAG continuous wave (CW) cutting head 42, see FIG. 1. The robot 41 is controlled via a system controller 44. The robot 41 is commercially available from Motoman Inc. under the trademark Motoman® K10S or K10ASB robot. The controller 44 is likewise commercially available from Motoman Inc. A fiber optic cable 46 connects the cutting head 42 with a conventional Nd:YAG laser 48. The device 40 may alternatively comprise any machine used in welding, such as a $CO_2$ laser device or an electric-arc welding device.

Figure 3:
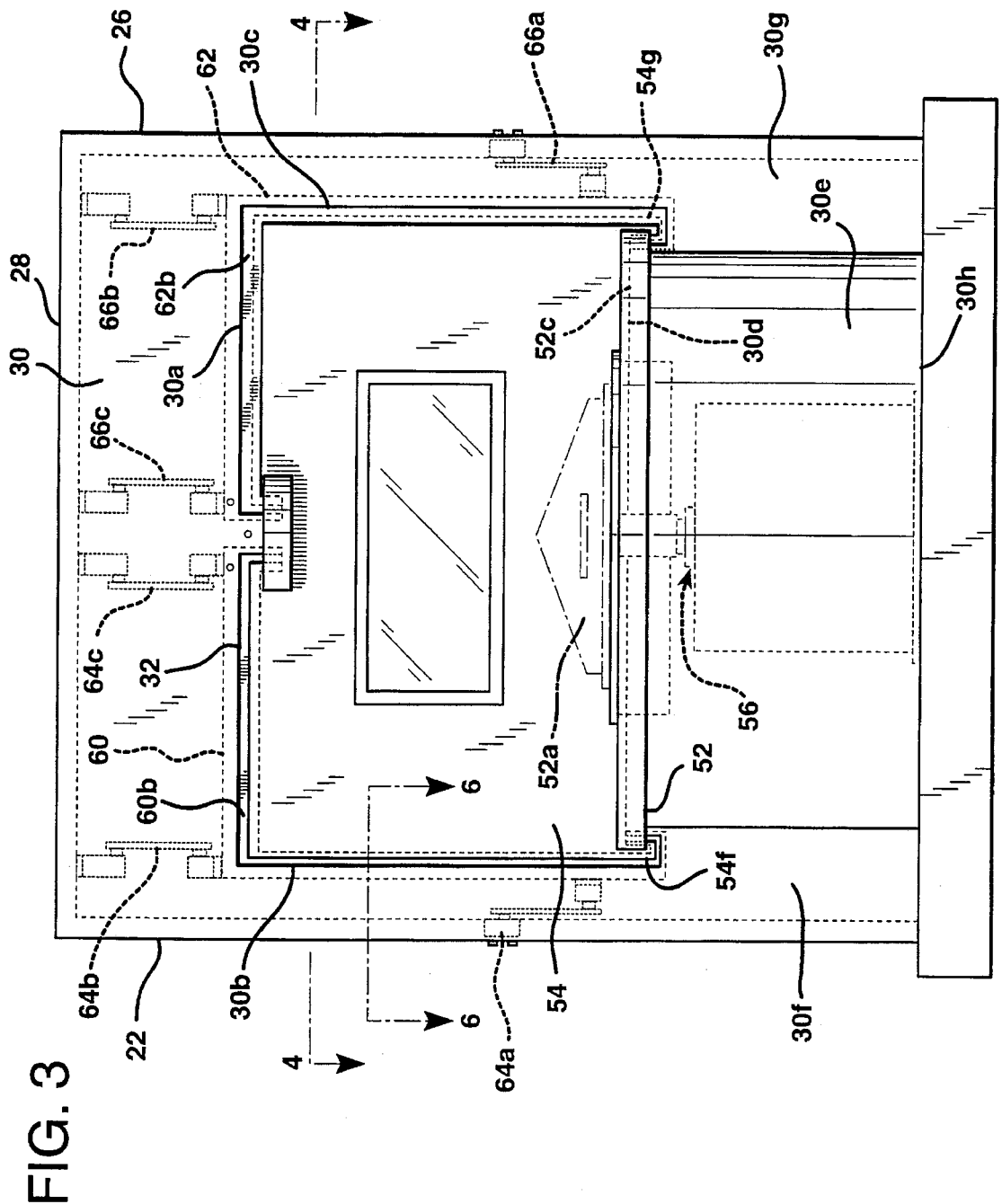
FIG. 3 is a front view of the enclosure of FIG. 1.

The front section 30 includes an opening 32, see FIG. 3, through which the workpieces 20c pass into and out of the inner cavity 20a. The opening 32 is defined by upper, side and lower edges 30a, 30b, 30c and 30d of the front section 30, see also FIG. 4.

The enclosure 10 further includes a rotary turntable 52 for moving the workpieces 20c through the opening 32 into and out of the inner cavity 20a. The rotary turntable's center of rotation is generally coplanar with the center of the front section 30. A vertical partition 54 is fixedly mounted on the turntable 52 for rotation therewith. The vertical partition 54 extends through the center of rotation of the rotary turntable 52, see FIG. 4. Fixtures 52a are secured on the upper surface 52b of the turntable 52 for mounting the workpieces 20c to the turntable 52.

The turntable 52 is adapted for approximately 180° reciprocating travel between first and second locked positions. A drive mechanism 56 is coupled to the turntable 52 for rotating the turntable 52 back and forth between its two locked positions, see FIGS. 1 and 3. Actuation of the drive mechanism 56 is effected by the controller 44. Two non-contact proximity sensors 70a and 70b are independently connected to two input channels of the controller 44 in order to confirm that the turntable 52 has correctly traveled to either of its first and second locked positions. The two non-contact proximity sensors 70a and 70b are fixed inside the inner cavity 20a, such as to turntable base 52d, so that each sensor 70a and 70b can detect the presence or absence of only one of two buttons 71a and 71b. The two buttons 71a and 71b are attached to the underside of the turntable 52 such that the second button 71b is nearer the axis of rotation of the turntable 52 than the first button 71a, see FIG. 1. The controller 44 only permits the processing of the workpieces to commence if the turntable 52 has correctly traveled to either of its first or second locked positions. When the turntable 52 is located in its first locked position, the button 71a will be positioned directly across from the sensor 70a. When the turntable 52 is located in its second locked position, the button 71b will be positioned directly across from the sensor 70b.

A lower central front portion 30e of the section 30 extends out from front lateral portions 30f and 30g of the section 30 to encase the drive mechanism 56 in a semicylindrical housing. A planar surface 30h is attached underneath the lower central front portion 30e to further encase the drive mechanism 56 and to inhibit the escape of the laser energy from the enclosure 10.

Figure 2:
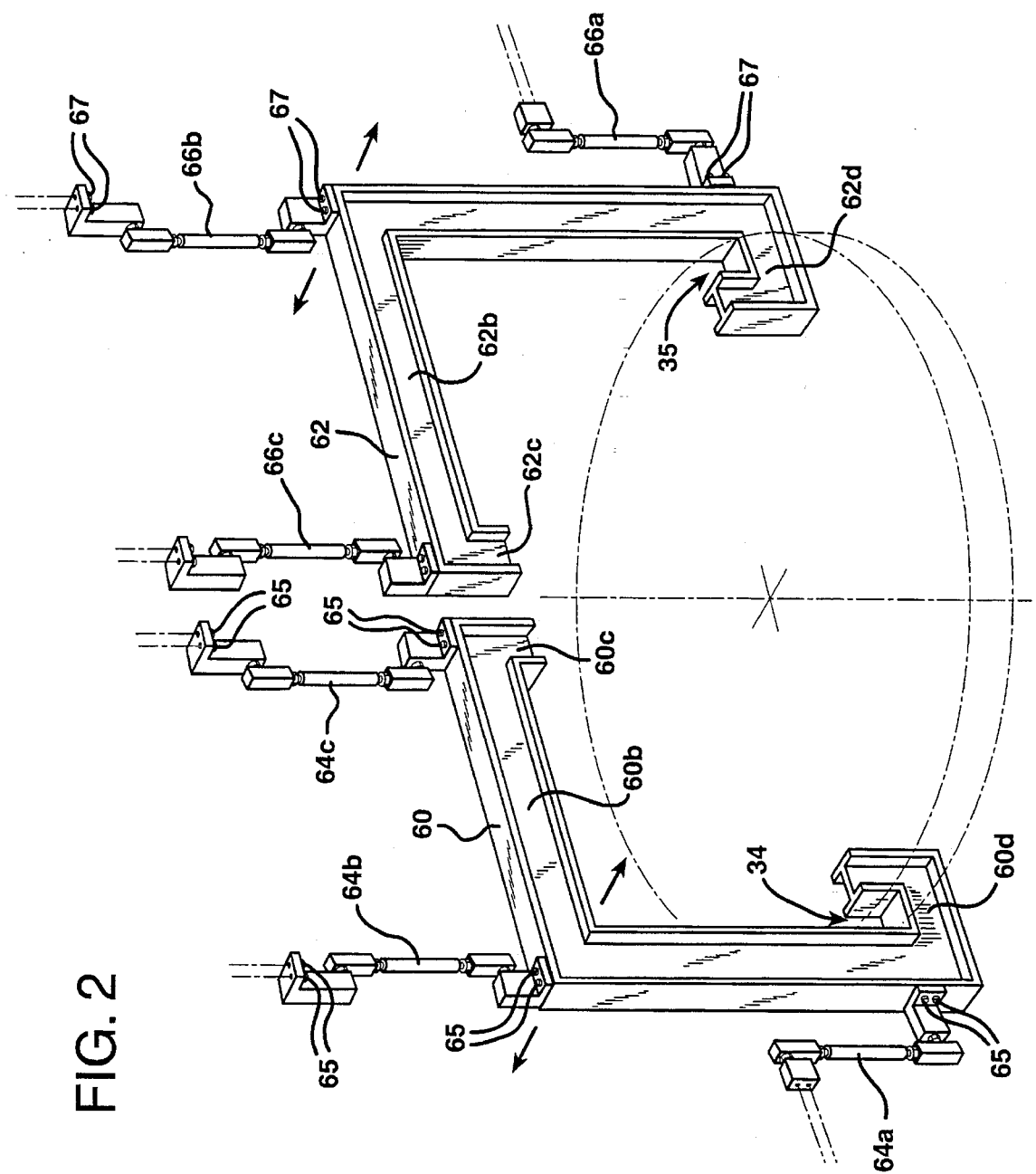
FIG. 2 is a perspective view of first and second sealing members of the enclosure shown in FIG. 1.
Figure 8:
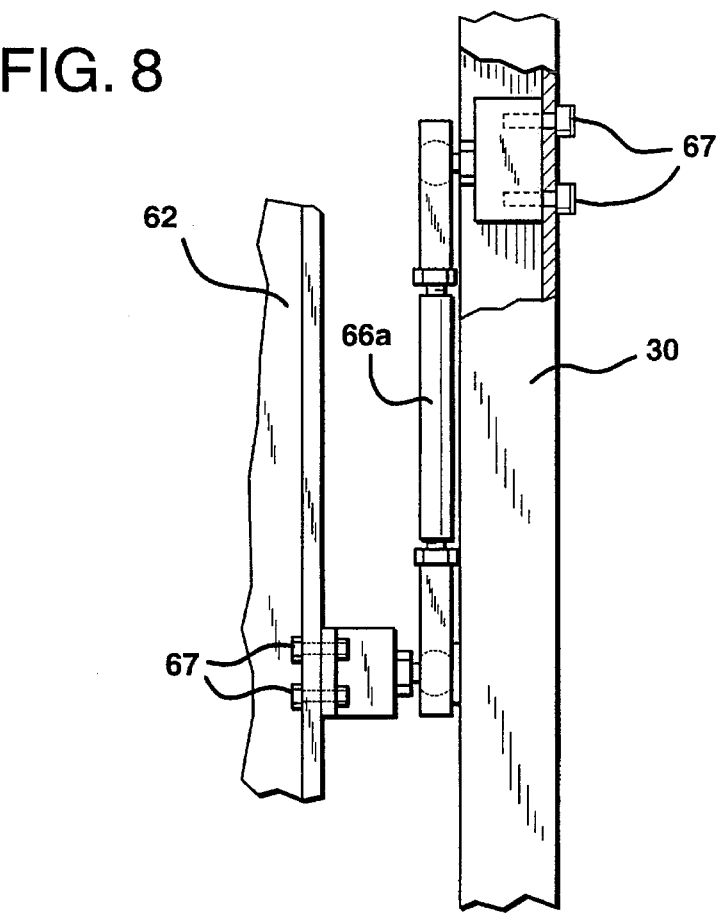
FIG. 8 shows a lateral pendulum pivot link of the enclosure of FIG. 1.
Figure 9:
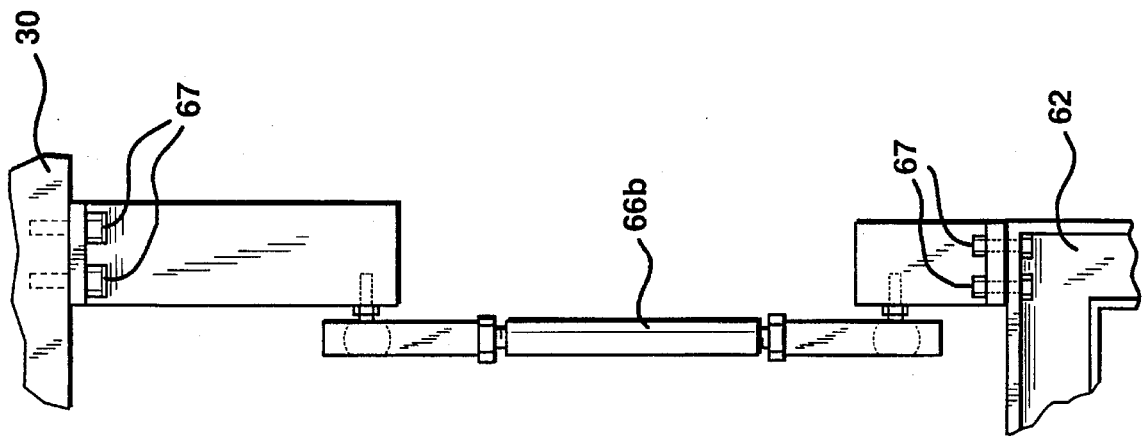
FIG. 9 shows an upper pendulum pivot link of the enclosure of FIG. 1.
Figure 11:
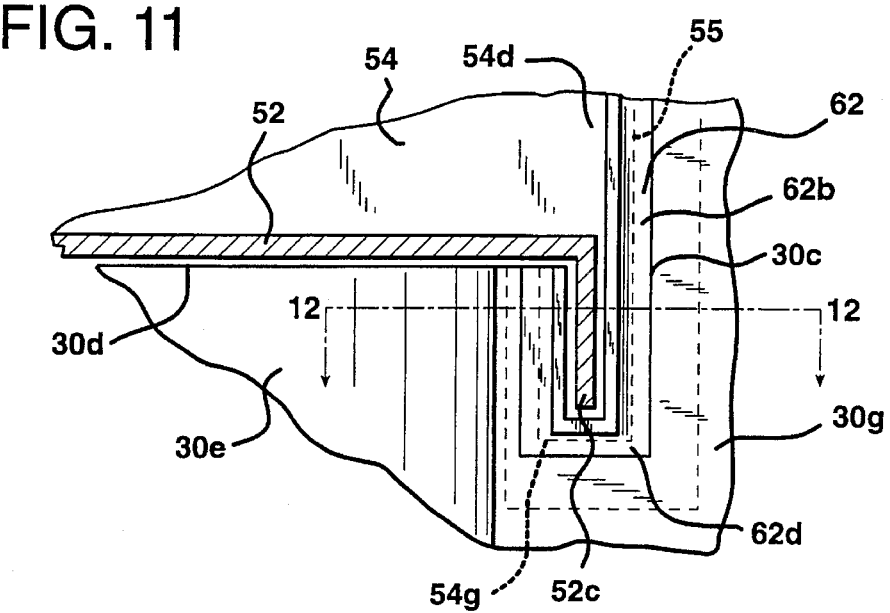
FIG. 11 is an enlarged view of the C-shaped section of the second sealing member which defines a gap through which a downwardly extending edge of a rotary turntable passes.
Figure 12:
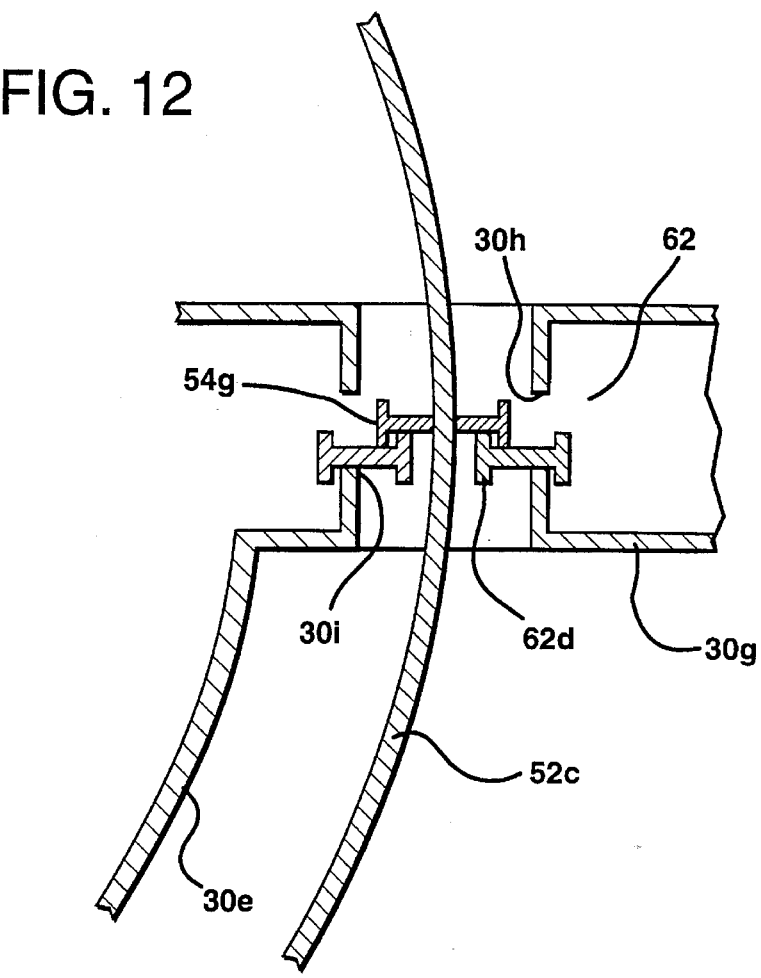
FIG. 12 is a view taken along section line 12—12 in FIG. 11.
Figure 13:
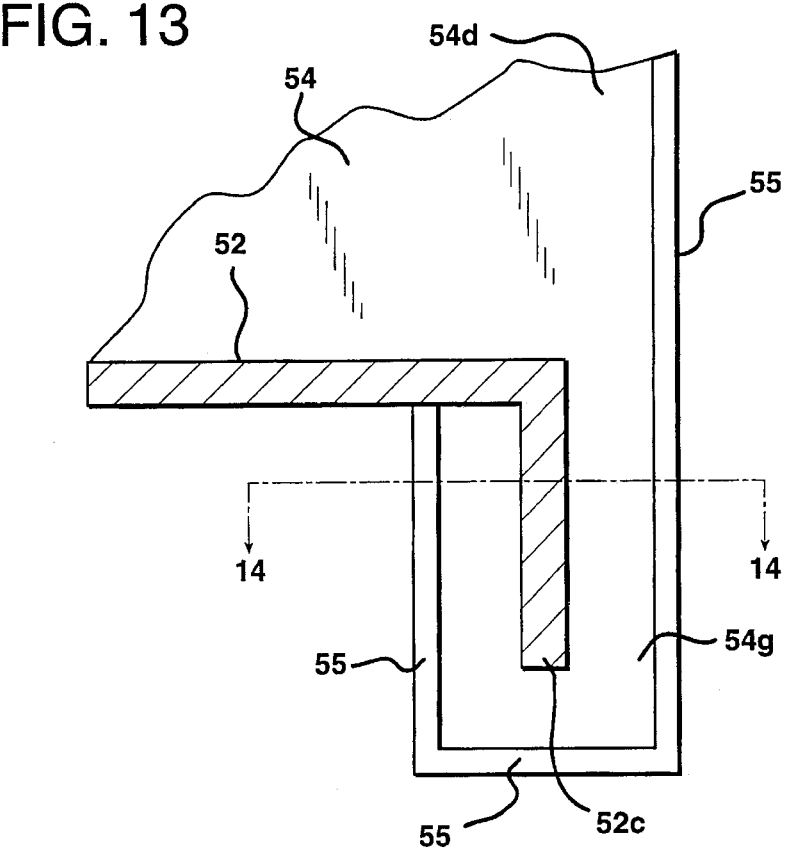
FIG. 13 is an enlarged view of only the second lower corner extension of the vertical partition shown in FIG. 11.
Figure 14:
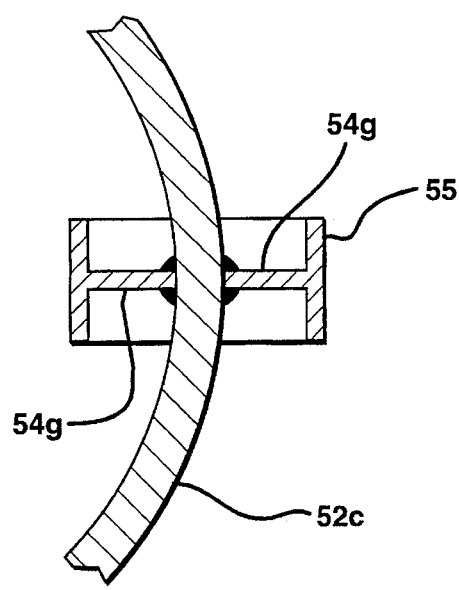
FIG. 14 is a view taken along section line 14—14 in FIG. 13.

First and second sealing members 60 and 62 are movably coupled within the front channel section 30 of the housing 20, see FIGS. 1–3 (the second sealing member 62 is not shown in FIG. 1 for clarity of illustration). A first lateral pendulum pivot link 64a and first and second upper pendulum pivot links 64b and 64c are fixedly connected by bolts 65 to the first sealing member 60 and the channel section 30 for movably coupling the first sealing member 60 to the section 30. A second lateral pendulum pivot link 66a and third and fourth upper pendulum pivot links 66b and 66c are fixedly connected by bolts 67 to the second sealing member 62 and the channel section 30, see also FIGS. 8 and 9, for movably coupling the second sealing member 62 to the section 30.

As best shown in FIGS. 2 and 4, each of the first and second sealing members 60 and 62 comprises a beam having a generally I-shaped cross section. Accordingly, the first sealing member 60 has inner and outer substantially planar surfaces 60a and 60b, respectively, and the second sealing member 62 has inner and outer substantially planar surfaces 62a and 62b, respectively, see FIG. 4.

The vertical partition 54 has a T-shaped outer edge 55 extending along its first and second upper portions 54a and 54b and its first and second side portions 54c and 54d, see FIGS. 4, 5–7 and 10. The partition 54 further includes a generally planar edge 56 which extends along its centrally located upper portion 54e, which is interposed between the first and second upper portions 54a and 54b. The partition 54 additionally includes first and second lower corner extensions 54f and 54g, each of which is integral with a downwardly extending edge 52c of the turntable 52, see FIGS. 11–14. Each of the extensions 54f and 54g extends out from opposite sides of and below the edge 52c of the turntable 52. The outer edge 55 extends along the first and second corner extensions 54f and 54g.

Figure 5:
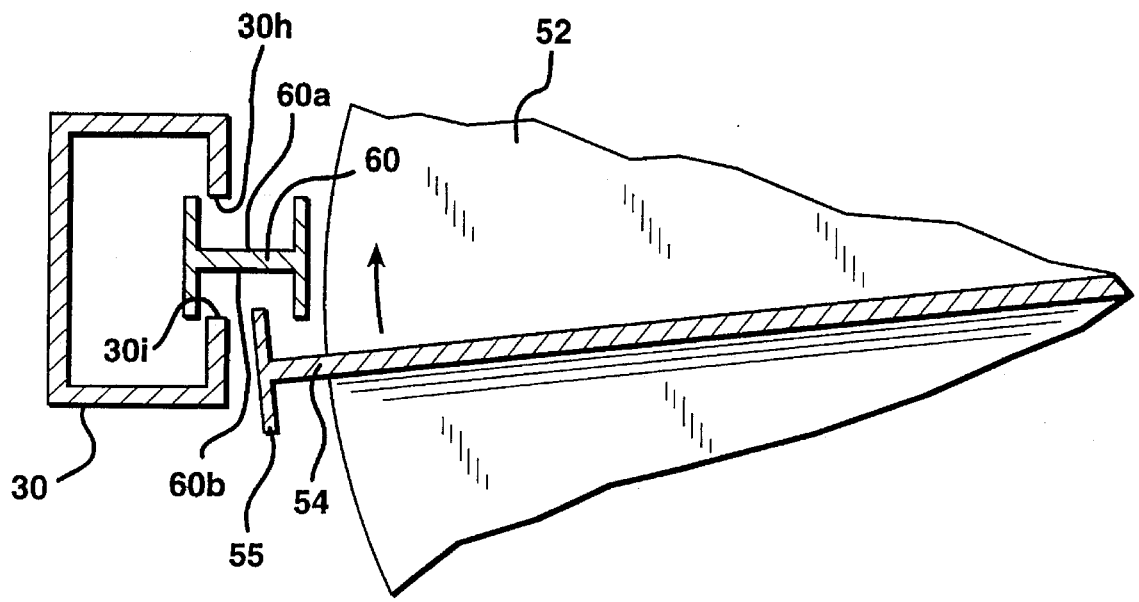
FIGS. 5–7 are sequential schematic illustrations without the pendulum pivot links showing the operation of the apparatus of FIG. 1.
Figure 6:
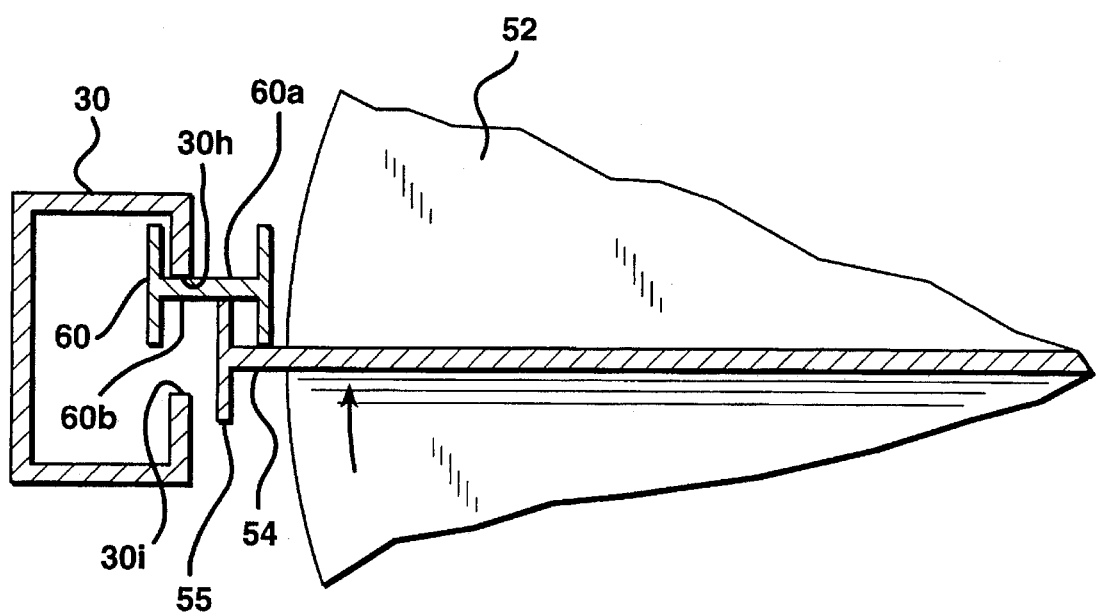

As the turntable 52 rotates clockwise from its second locked position to its first locked position, see FIG. 5, the outer edge 55 engages with the outer surface 60b of the first sealing member 60 and moves the first sealing member 60 to its first sealed position where its inner surface 60a is engaged with an inner sealing edge 30h of the front section 30, see FIG. 6. Further, during rotation of the turntable 52 from its second locked position to its first locked position, the outer edge 55 engages with the inner surface 62a of the second sealing member 62 and moves the second sealing member 62 to its first sealed position where its outer surface 62b is engaged with an outer sealing edge 30i of the front section 30, see FIG. 4.

Figure 7:
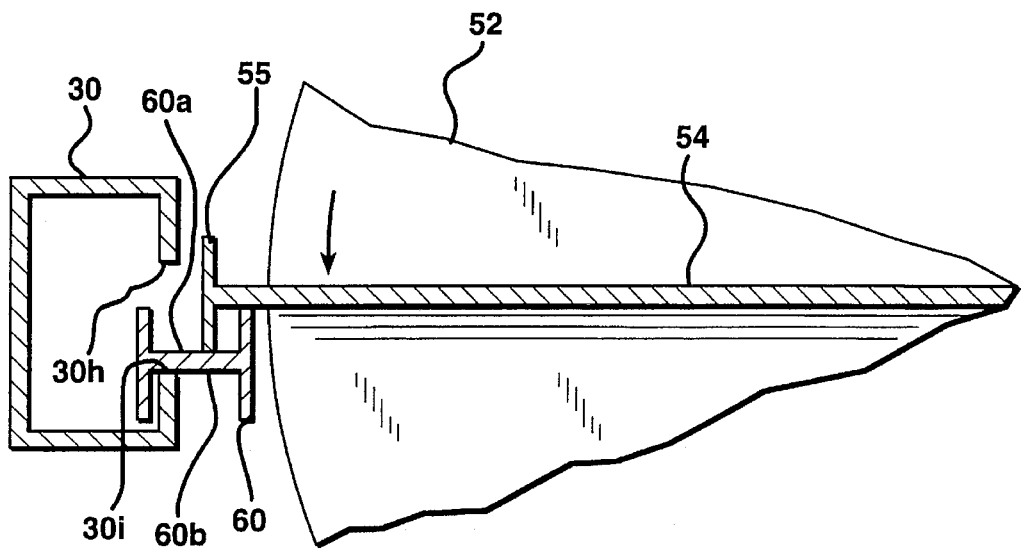

When the turntable 52 rotates counterclockwise from its first locked position to its second locked position, the outer edge 55 engages with the inner surface 60a of the first sealing member 60 and moves the first sealing member 60 to its second sealed position where its outer surface 60b is engaged with the outer sealing edge 30i of the front section 30, see FIG. 7. Further, as the turntable 52 is rotating to its second locked position, the outer edge 55 engages with the outer surface 62b of the second sealing member 62 and moves the second member 62 to its second sealed position where its inner surface 62a is engaged with the inner sealing edge 30h of the front section 30. When the sealing members 60 and 62 are in one of their two sealed positions, they serve to inhibit laser energy from exiting the housing 20 through the opening 32.

Figure 10:
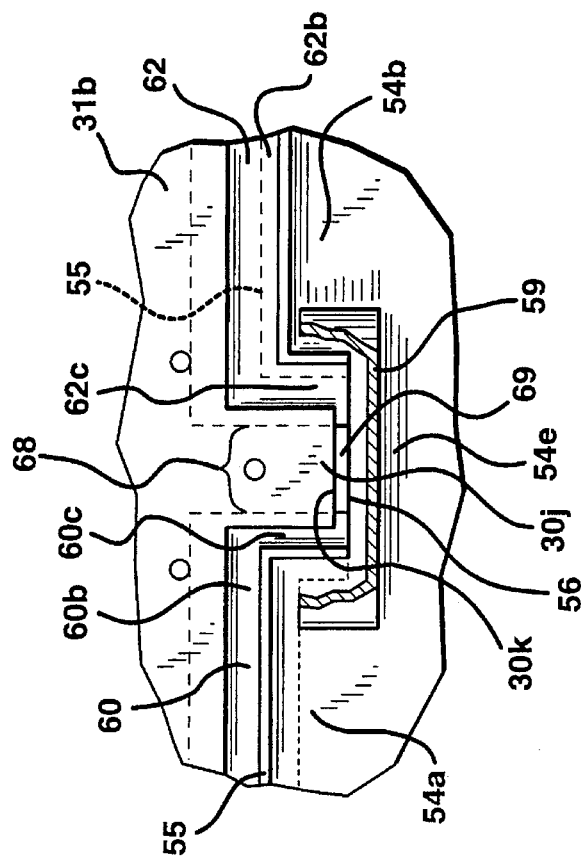
FIG. 10 is an enlarged view of a centrally located upper portion of the vertical partition, upper ends of the first and second sealing members, a downwardly extending portion on the outer panel of the front section, and an outwardly projecting blocking member on the vertical partition, which member is shown partially broken-away.

The front section 30 includes inner and outer panels 31a and 31b, see FIG. 4. As best shown in FIG. 10, the outer panel 31b has a downwardly extending portion 30j which extends across a gap 68 positioned between respective upper ends 60c and 62c of the first and second sealing members 60 and 62. The downwardly extending portion 30j serves to inhibit laser energy from exiting the housing 20 through the gap 68. The inner panel 31a likewise includes a downwardly extending portion (not shown) which extends across the gap 68 between the ends 60c and 62c of the sealing members 60 and 62. The vertical partition 54 is provided with an outwardly projecting blocking member 59 which is shown partially broken-away in FIG. 10 and serves to block laser energy which might pass through a gap 69 positioned between the lower edge 30k of the downwardly extending portion 30j and the edge 56 of the partition 54.

The first sealing member 60 has a lower C-shaped section 60d which defines a first gap 34 through which the downwardly extending edge 52c of the turntable 52 passes as the turntable 52 rotates between its first and second locked positions, see FIGS. 2 and 3. Similarly, the second sealing member 62 has a lower C-shaped section 62d which defines a second gap 35 through which the downwardly extending edge 52c of the turntable 52 passes as the turntable 52 rotates between its first and second locked positions, see FIGS. 11 and 12. Because the generally T-shaped outer edge 55 extends below the upper surface 52b of the turntable onto the lower corner extensions 54f and 54g of the vertical partition 54, see FIG. 13, a proper overlap of the surfaces is created in either of the first and second locked positions. Accordingly, a vast majority of the laser radiation emitted within the housing 20 is prevented from escaping through the gaps 34 and 35 such that the laser device 40 may operate as a Class I laser.

In an alternative embodiment of the present invention, first and second sealing members are movably coupled to the vertical partition 82 of the turntable 84 rather than to the front section 86. See FIGS. 15–17, wherein only the first sealing member 80 is shown. The first and second sealing members are located within a peripheral recess 82a in the vertical partition 82 and are movably coupled to the vertical partition 82, such as by a plurality of pendulum pivot links (not shown).

Figure 15:
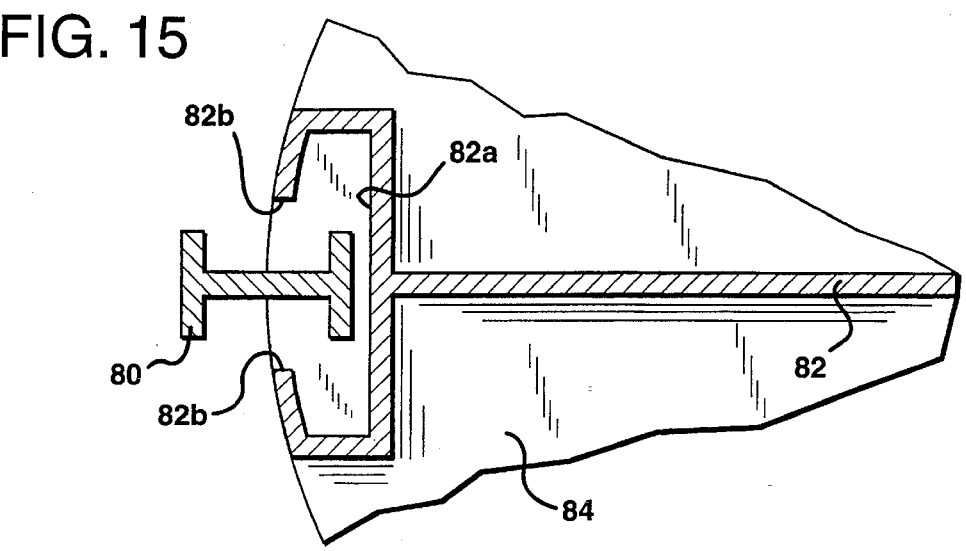
FIG. 15 is a schematic illustration of a portion of an enclosure formed in accordance with an alternative embodiment of the present invention.
Figure 16:
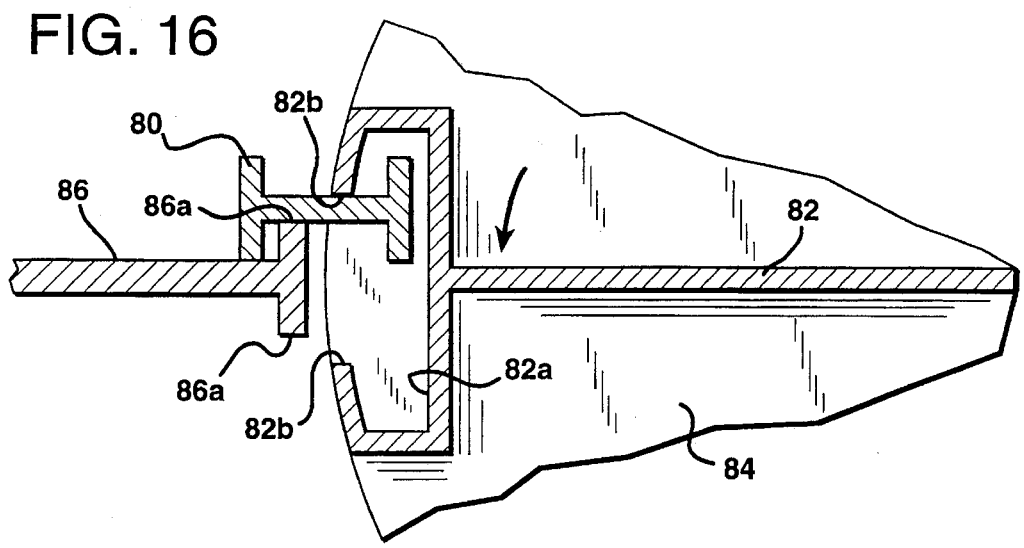
FIGS. 16 and 17 are schematic illustrations without the pendulum pivot links showing the operation of the apparatus of FIG. 15.
Figure 17:
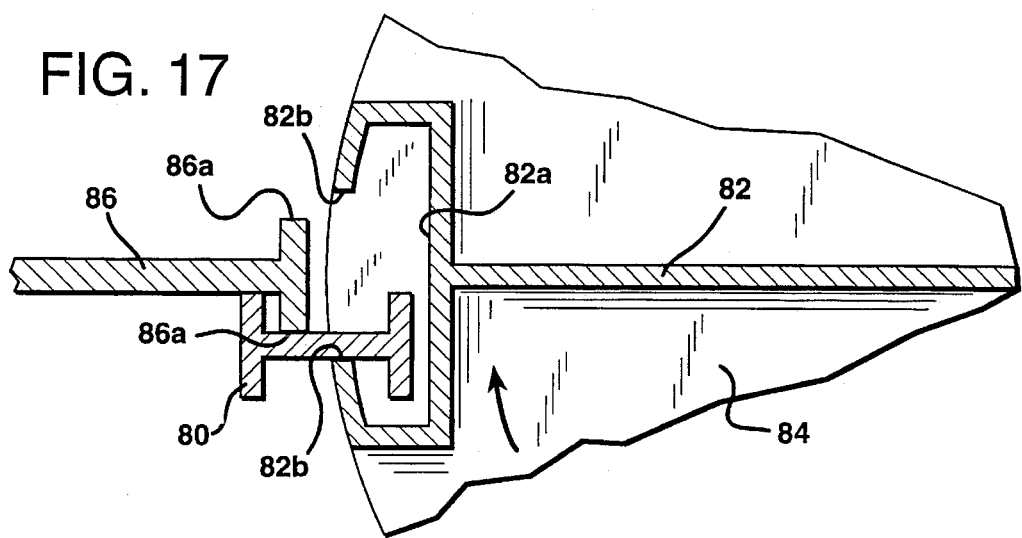

The first and second sealing members represented by the sealing member 80 in FIGS. 15–17, extend along upper and side edges of the vertical partition 82. Thus, the first and second sealing members move between first and second sealed positions, see FIGS. 17 and 16, as the turntable 84 rotates between its first and second locked positions. When positioned in either of its first or second sealed positions, the first and second sealing members engage with a T-shaped edge 86a on the front section 86 and an edge 82b on the portion of the vertical partition 82 defining the peripheral recess 82a for sealing the front section 86 to the vertical partition 82.

With the present invention, a protective laser enclosure is provided for encasing a Class IV laser to allow it to operate as a Class I laser. The enclosure includes an improved passive sealing arrangement comprising first and second sealing members 60 and 62 which interact with the vertical partition 54 and the section 30 of the housing 20 for sealing the partition 54 to the section 30 to inhibit an unacceptable amount of laser energy from escaping the housing 20 through the opening 32 in the section 30.

Having described the invention in detail and by reference to preferred embodiments thereof, it will be apparent that modifications and variations are possible without departing from the scope of the invention as defined in the appended claims.

What is claimed is:

1. A laser system comprising:

a generator for generating and directing a laser beam to a laser workstation;

a housing having an inner cavity for containing said laser workstation, said housing including a section having an opening through which workpieces pass into and out of said inner cavity;

a transport device for moving said workpieces through said opening into and out of said inner cavity; and, passive sealing apparatus movably coupled to one of said section and said transport device for sealing a portion of said transport device with a portion of said section to inhibit laser energy from exiting said housing through said opening.

2. A laser system as set forth in claim 1, wherein said housing further comprises:

first, second and third generally vertical walls; and a stationary ceiling connected to said first, second and third walls and said section.

3. A laser system as set forth in claim 1, wherein said transport device comprises a rotary turntable and a vertical partition mounted on said rotary turntable for rotation therewith, said vertical partition extending through the center of said rotary turntable.

4. A laser system as set forth in claim 1, wherein said passive sealing apparatus comprises first and second sealing members and attachment apparatus for movably mounting said first and second sealing members to said section.

5. A laser system as set forth in claim 4, wherein said transport device rotates between first and second locked positions and engages with said first and second sealing members as it rotates to either of its first and second locked positions to move said first and second sealing members to a sealed position.

6. A laser system as set forth in claim 5, wherein said first and second sealing members each have inner and outer substantially planar surfaces, said portion of said transport device engages with said outer surface of said first sealing member and said inner surface of said second sealing member when said transport device is positioned in its first locked position and engages with said inner surface of said first sealing member and said outer surface of said second sealing member when said transport device is positioned in its second locked position.

7. A laser system as set forth in claim 4, wherein said attachment apparatus comprises two first pendulum pivot links coupled between said section and said first sealing member and two second pendulum pivot links coupled between said section of said housing and said second sealing member.

8. A laser system as set forth in claim 4, wherein each of said first and second sealing members comprises a beam having a generally I-shaped cross section.

9. A laser system as set forth in claim 4, wherein said portion of said transport device has a generally T-shaped cross section.

10. A laser system as set forth in claim 4, wherein said transport device is adapted for 180° reciprocating travel between first and second locked positions.

11. A system for operating on a workpiece comprising:

a welding device at a welding workstation;

a housing having an inner cavity for containing said welding workstation, said housing including a section having an opening through which workpieces pass into and out of said inner cavity;

a transport device for moving said workpieces through said opening into and out of said inner cavity; and, passive sealing apparatus movably coupled to one of said section and said transport device for sealing a portion of said transport device with a portion of said section to inhibit electromagnetic energy from exiting said housing through said opening.

12. A system as set forth in claim 11, wherein said housing further comprises:

first, second and third generally vertical walls; and a stationary ceiling connected to said first, second and third walls and said section.

13. A system as set forth in claim 11, wherein said transport device comprises a rotary turntable and a vertical partition mounted on said rotary turntable for rotation therewith, said vertical partition extending through the center of said rotary turntable.

14. A system as set forth in claim 11, wherein said passive sealing apparatus comprise first and second sealing members and attachment apparatus for pivotably mounting said first and second sealing members to said section.

15. A system as set forth in claim 14, wherein said transport device rotates between first and second locked positions and engages with said first and second sealing members as it rotates to either of its first and second locked positions to move said first and second sealing members to a sealed position.

16. A system as set forth in claim 15, wherein said first and second sealing members each have inner and outer substantially planar surfaces, said portion of said transport device engages with said outer surface of said first sealing member and said inner surface of said second sealing member when said transport device is positioned in its first locked position and engages with said inner surface of said first sealing member and said outer surface of said second sealing member when said transport device is positioned in its second locked position.

17. A system as set forth in claim 14, wherein said attachment apparatus comprises two first pendulum pivot links coupled between said section and said first sealing member and two second pendulum pivot links coupled between said section and said second sealing member.

18. A system as set forth in claim 14, wherein each of said first and second sealing members comprises a beam having a generally I-shaped cross section.

19. An enclosure comprising:

a housing having an inner cavity for containing a welding workstation, said housing including a section having an opening through which workpieces pass into and out of said inner cavity;

a transport device for moving said workpieces through said opening into and out of said inner cavity; and, passive sealing apparatus movably connected to one of said section and said transport device for sealing a portion of said transport device with a portion of said section to inhibit electromagnetic energy from exiting said housing through said opening.

20. A system as set forth in claim 19, wherein said passive sealing apparatus comprises first and second sealing members and attachment apparatus for pivotably mounting said first and second sealing members to said section.

* * * * *